United States Patent
Guan et al.

(10) Patent No.: US 12,416,739 B2
(45) Date of Patent: Sep. 16, 2025

(54) METHOD AND APPARATUS FOR SOURCE WAVELET ESTIMATION

(71) Applicant: CHINA PETROLEUM & CHEMICAL CORPORATION, Beijing (CN)

(72) Inventors: Huimin Guan, Houston, TX (US); Fengqi Zhang, Beijing (CN); Jianxing Hu, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 82 days.

(21) Appl. No.: 18/525,096

(22) Filed: Nov. 30, 2023

(65) Prior Publication Data

US 2024/0176038 A1 May 30, 2024

Related U.S. Application Data

(60) Provisional application No. 63/385,430, filed on Nov. 30, 2022.

(51) Int. Cl.
*G01V 1/50* (2006.01)
*G01V 1/104* (2006.01)

(52) U.S. Cl.
CPC ............ *G01V 1/50* (2013.01); *G01V 1/104* (2013.01); *G01V 2210/62* (2013.01); *G01V 2210/643* (2013.01); *G01V 2210/679* (2013.01)

(58) Field of Classification Search
CPC ............ G01V 1/50; G01V 2210/62; G01V 2210/679; G01V 1/282; G01V 2210/614

USPC ........................................... 367/25, 14
See application file for complete search history.

(56) References Cited

U.S. PATENT DOCUMENTS

| | | | |
|---|---|---|---|
| 2015/0012256 A1 | 1/2015 | Routh et al. | |
| 2017/0199289 A1 | 7/2017 | Peng et al. | |
| 2021/0255349 A1* | 8/2021 | Zhou | G01V 1/282 |

OTHER PUBLICATIONS

Rajput ("Transforming seismic reflection data into quantitative rock properties by seismic inversion." IPTC 2014: International Petroleum Technology Conference. European Association of Geoscientists & Engineers, 2014.) (Year: 2014).*

(Continued)

*Primary Examiner* — Yuqing Xiao
*Assistant Examiner* — Christopher Richard Walker
(74) *Attorney, Agent, or Firm* — NKL Law; Allen Xue (57) ABSTRACT

A method for estimating source wavelet for seismic survey includes multiple steps. First, seismic data are collected using seismic data recording sensors and well log data are collected using a well logging tool in a well site in a survey region. The seismic data and the well log data are stored and processed in a computer system. The time-migrated seismic data thus collected and processed is the observed data. The well log data is processed to obtain one or more earth models that represent one or more formation properties; reflectivity modeling is performed to obtain a reflectivity, a band pass filter and time-migrated reflectivity to produce a band-limited reflectivity; the band-limited reflectivity is cross-correlated with the observed data to obtain a weight; and inversion is performed to obtain a source wavelet based on the weight, the reflectivity, and the observed data.

7 Claims, 10 Drawing Sheets

(56) References Cited

OTHER PUBLICATIONS

De Macedo et al. ("Comparison between deterministic and statistical wavelet estimation methods through predictive deconvolution: Seismic to well tie example from the North Sea." Journal of Applied Geophysics 136 (2017): 298-314.) (Year: 2017).*
Ma et al. ("Seismic modeling with the reflectivity method." CREWES Research Report 15 (2004): 1-7.) (Year: 2004).*
Kennett ("Lithosphere-asthenosphere P-wave reflectivity across Australia." Earth and Planetary Science Letters 431 (2015): 225-235.) (Year: 2015).*
Chopra et al. ("Seismic resolution and thin-bed reflectivity inversion." CSEG recorder 31.1 (2006): 19-25.) (Year: 2006).*
G. MULLER,"The reflectivity method: a tutorial", Journal of Geophysics, Dec. 19, 1985, vol. 58, No. 1, pp. 153-174.

* cited by examiner

METHOD AND APPARATUS FOR SOURCE WAVELET ESTIMATION

TECHNICAL FIELD

The present disclosure relates to seismic survey methods and apparatus for constructing high resolution geological models, particularly related to source wavelet estimation.

BACKGROUND OF INVENTION

1. Overview

In oil and gas exploration, seismic data are acquired and processed to generate high-resolution subsurface property volumes such as seismic propagation velocity, anisotropy, absorption, porosity, and reflectivity models. These geophysical properties can be combined to effectively reveal the subsurface structure. Seismic data processing usually includes seismic inversion for building propagation velocity models of long to intermediate wavenumbers and then seismic migration to obtain short wavenumbers seismic reflectivity images. These seismic reflectivity images are used to determine the storage location and size of natural resources, such as hydrocarbons of oil and gas, which informs the exploration/drilling plan. To acquire high-resolution seismic reflectivity images, one needs high multifold acquisition systems designed to obtain sufficient seismic data as well as good seismic velocity models having correct kinematic information before conducting seismic migration.

Existing seismic velocity inversion methods include ray-based seismic tomography and full waveform inversion (FWI) methods. Ray-based tomography methods are efficient and may invert smooth models, which may be sufficient for relatively simple geologic targets, such as shallow sediment environments. However, for complex geologic environments, such as salt domes, sub-basalt targets, overthrust belts, and land foothills, ray-based tomography is not effective and FWI becomes a necessary tool to build velocity model.

FWI directly solves seismic wave equations and matching seismic data, which can produce more accurate seismic propagation velocity models for complex subsurface structures, such as salt-related models. Such propagation velocity models can be used to produce accurate and high-resolution seismic reflectivity images through seismic migration, promote time-lapse monitoring of hydrocarbon reservoirs, and can even directly be transformed to produce high resolution seismic image volumes named as FWI image.

2. Seismic Wave Equations

The seismic waves propagating under the subsurface of the earth are simulated by solving seismic wave equations. Seismic wave equations describe the earth with different physical models, with assumptions that the earth is isotropic or anisotropic, elastic, or acoustic, and attenuated or not. In most FWI developments, the seismic waves were assumed as purely acoustic because the acoustic wave equation is relatively simple and can be solved efficiently. Regardless the assumptions made, all wave equations can be mathematically represented as $$F(m;x)w_s(x,t)=s, \quad (1)$$

The vector m is the earth model, which refers to a representation of the subsurface properties of the earth, such as the distribution of seismic wave velocities, density, and other physical properties. x is the spatial location, t is time, $F(m; x)$ is the corresponding (forward) modelling operator, and $w_s(x, t)$ is the forward wavefield for a source wavelet s excited at a certain location.

Numerical solutions of equation (1) have discretization of both spatial variables x and time variable t. such that the solution $w_s(x, t)$ is discretized as $w_s(x_i, t_j)$, where $i=1, \ldots,$ N is the grid point with N total grid points, and $j=1, \ldots, N_t$ is the time step with a total of $N_t$ time steps. The commonly used numerical methods are finite difference method, finite element method, and spectral element method. As shown in the disclosure, the method disclosed herein is independent of the form of the wave equation (1) and the numerical method used to solve it.

3. Full Waveform Inversion (FWI)

FWI is a data-driven tool to automatically build the subsurface parameter m, such as velocity and/or density, by iteratively minimizing the difference between recorded data and modeled synthetic data. Given an initial estimate of the subsurface velocity $m_0$, the synthetic data are predicted by solving a forward seismic wave-equation (1) with a source wavelet $f_s$ (t). An adjoint equation of the forward wave equation (1) is solved using the residual between the data and synthetic data as source to get the adjoint wave equation solutions, and a gradient is obtained by cross-correlating the forward and adjoint wave equation solutions, then this gradient is used to update the model along the direction to reduce the misfit between the modeled synthetic data and observed field data. This is repeated in an iterative solution until the data-misfit is sufficiently small.

4. Source Wavelet Estimation

As can be seen from the above discussions, estimating source wavelet $f_s(t)$ is a key step in seismic data processing, including in wave-equation based AVO inversion, classical AVO and/or attribute inversion, FWI, etc. One of the methods for estimating source wavelet is by matching the observed data and the synthetic data, while assuming the model which generates the data is known. For FWI of marine data first arrivals that travel in the water usually are used to estimate the source wavelet because it is relatively easy to identify the first arrival in the observed data and water velocity is known. While for wavelet estimation in wave-equation based AVO inversion and classical AVO inversion, source wavelet is estimated through seismic well tie, which matches well synthetic data (i.e., synthetic data) to the seismic data measured at the well location.

For field data, the observed data may not match the well synthetic data for many reasons. For example, in a particular event, the travel time in the observed data may not match that in the synthetic data. Events in the observed data may not exist in the synthetic data and vice versa. The mismatch may be caused by the fact that the observed data is from 3-D geometry, while the synthetic data is based on 1.5D model. In addition, the well log may not be vertical; both the well log and the observed data may contain errors; the well location may not exactly be the same as the common mid-point (CMP) location.

Since the only events that match will contribute positively to the estimated source wavelet, there is a need to select and enhance only matched events to more accurately estimate the source wavelet.

SUMMARY OF THE INVENTION

This disclosure provides methods and systems for estimating source wavelet in seismic data processing. One of the application for the estimated source wavelet is in wave-equation based AVO inversion.

In one of the embodiments, source estimation is first performed with time-migrated gather. Second, time-migration is applied to the synthetic data within time window calibrated with well depth marks tied with horizons so that the cross-correlation between the observed data and the synthetic data is maximized. The tie between the depth horizons and well marks ensures the time and depth window used is consistent. Next, cross-correlation between the observed and the synthetic data as a weight in the objective function, so that the events that match better will contribute more to the estimated source wavelet.

A method for estimating source wavelet for seismic survey includes multiple steps. First, seismic data are collected using seismic data recording sensors and well log data are collected using a well logging tool in a well site in a survey region. The seismic data and the well log data are stored and processed in a computer system. The time-migrated seismic data thus collected and processed is the observed data. The well log data is processed to obtain one or more earth models that represent one or more formation properties; reflectivity modeling is performed to obtain a reflectivity, a band pass filter and time-migrated reflectivity to produce a band-limited reflectivity; the band-limited reflectivity is cross-correlated with the observed data to obtain a weight; and inversion is performed to obtain a source wavelet based on the weight, the reflectivity, and the observed data.

According to an embodiment, the reflectivity modeling is based on Kennett modeling.

According to another embodiment, the earth model is a P-wave velocity model, a S-wave velocity model, or a density model of the formation.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Reference will now be made in detail to several embodiments of the present disclosures, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures, systems, and methods illustrated herein may be employed without departing from the principles of the disclosure described herein.

Throughout the specification, the terms approach(es) and method(s) are used interchangeably and have the same meaning. The following table provides definitions of symbols in equations throughout the specification.

The present disclosure relates to building high resolution geological models by performing an improved seismic full waveform inversion to improve images of complex subsurface structures (formations) in a survey region by applying methods, apparatuses, and mediums including one or more source-independent misfit functions.

FIGS. 1-4 show exemplary embodiments of methods, apparatuses, and mediums for obtaining and storing the seismic data, which is processed to generate the one or more high resolution geological models for high resolution images for lithology identification, fluid discrimination, and reservoir characterization of complex subsurface structures of a survey region. The survey region may be subsurface structures under land or subsurface structures under the sea.

Figure 1:
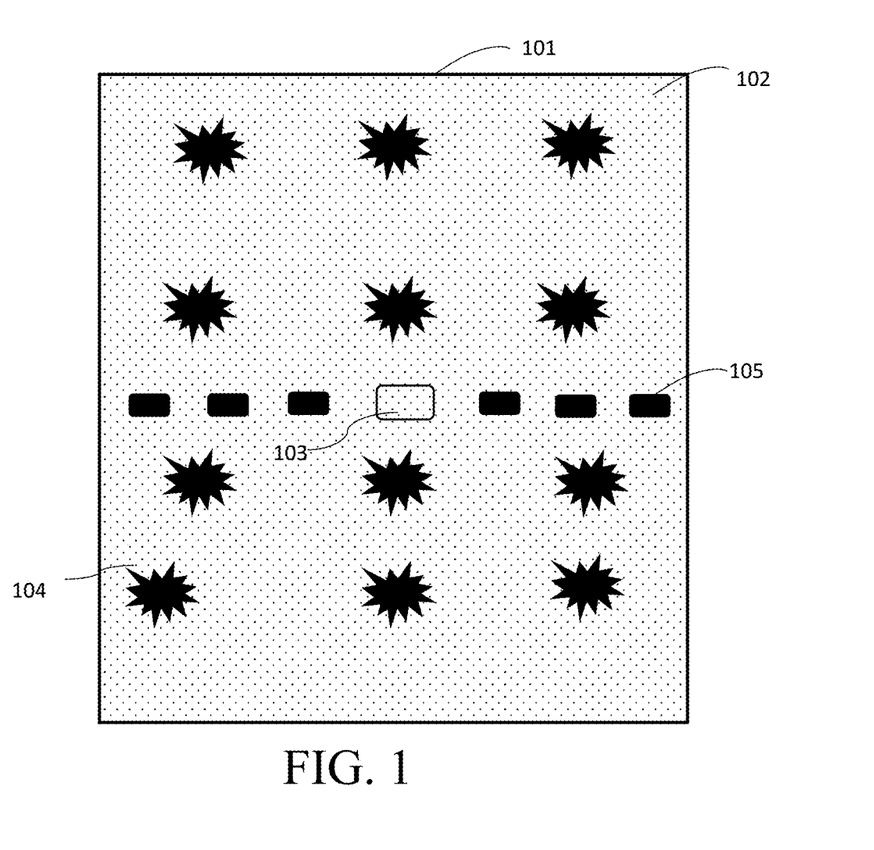
FIG. 1 is a is a schematic diagram illustrating a top view of a survey region with the various points of incidence of seismic sources according to an embodiment in this disclosure.

FIG. 1 is a schematic diagram illustrating a top view of a survey region with the various points of incidence of seismic sources according to an embodiment. More specifically, FIG. 1 illustrates a seismic survey region (survey region) 101, which is a land-based region denoted by reference numeral 102. Reference number 102 denotes the top earth formation of the land-based region 102. Persons of ordinary skill in the art, will recognize that seismic survey regions produce detailed images of local geology to determine the location and size of possible hydrocarbon (oil and gas) reservoirs, and therefore a well location 103. In these survey regions, seismic waves bounce off underground rock formations during emissions from one or more seismic sources at various points of incidence 104. A blast is an example of a seismic source generated by seismic equipment. The seismic waves that reflect back to the surface are captured by seismic data recording sensors 105, transmitted by one or more data transmission systems (frequently wirelessly) from the seismic data recording sensors 105, and stored for later processing and analysis by a high-performance computing system. Although this example shows a top earth formation of a land-based region 102, it is understood that this is only an example, and the methods and system may also be applied to a survey region at the bottom of an ocean.

Figure 2:
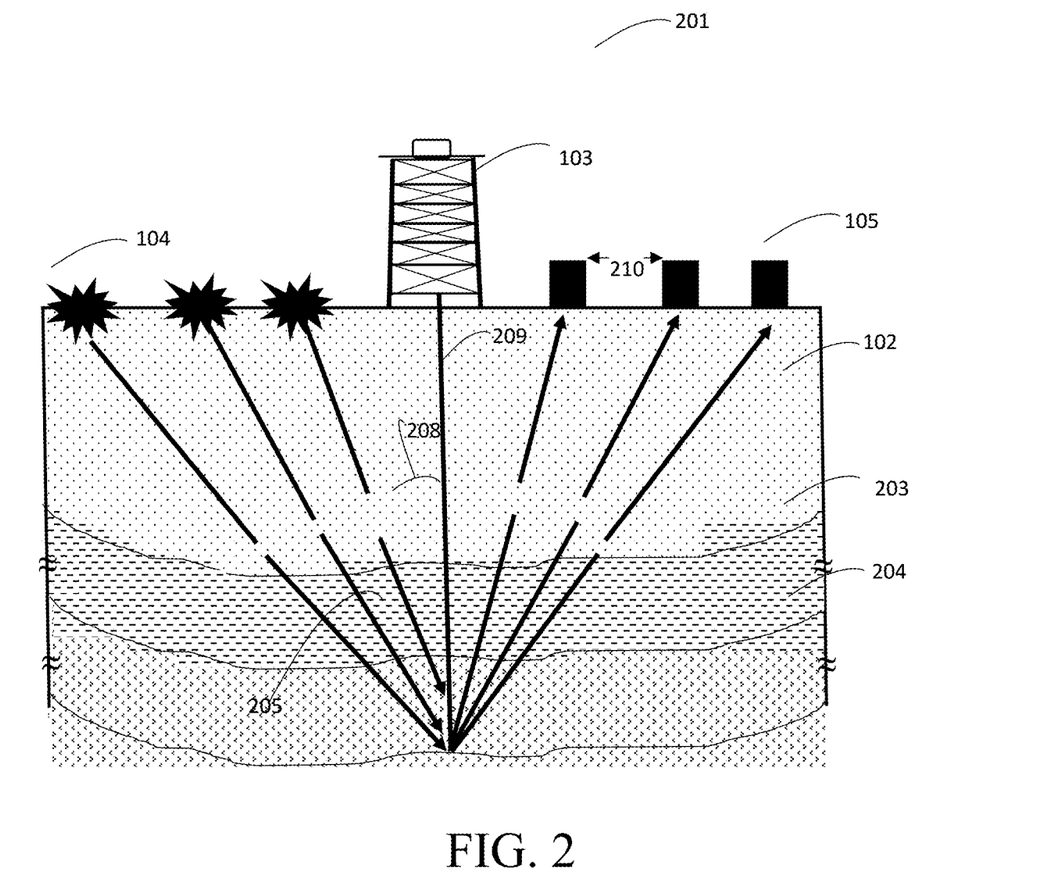
FIG. 2 is a schematic diagram illustrating a cross-sectional view of an environment with points of incidence of seismic sources, seismic data recording sensors, a well location, a wellbore, the various transmission rays, and the various angles of incidence, according to an embodiment.

FIG. 2 is a schematic diagram illustrating a cross-sectional view of a seismic survey region 101 in FIG. 1 with points of incidence of seismic sources, seismic data recording sensors (seismic receivers), a well location, a wellbore, the various transmission rays, and the various angles of incidence, according to an embodiment. More specifically, in FIG. 2 a cross-sectional view of a portion of the earth over the seismic survey region is denoted by reference numeral 201, showing different types of earth formations denoted by reference numerals 102, 203, and 204. Although the seismic survey region is based on land in this example, it is understood that this is only an example and that the methods and system may also be applied to a survey region at the bottom of an ocean. FIG. 2 illustrates a common midpoint-style gather, where seismic data are sorted by surface geometry to approximate a single reflection point in the earth. The survey seismic data may also be referred to as traces, gathers, or image gathers. In this example in FIG. 2, data from one or more shots or blasts and receivers may be combined into a single image gather or used individually depending upon the type of analysis to be performed.

As shown on FIG. 2, one or more shots or blasts represents seismic sources located at various points of incidence or stations denoted by reference numeral 104 at the surface of the Earth at which one or more seismic sources are activated. Seismic energy or seismic sources from multiple points of incidence 104, will be reflected from the interface between the different earth formations. These reflections will be captured by multiple seismic data recording sensors 105, each of which will be placed at different location offsets 210 from each other, and the well 103. Because all points of incidences 104, and all seismic data recording sensors 105 are placed at different offsets 210, the survey seismic data or traces, also known in the art as gathers or image gathers, will be recorded at various angles of incidence represented by 208. The points of incidence 104 generate downward transmission rays 205, in the earth that are captured by their upward transmission reflection through the seismic data recording sensors 105. Well location 103, in this example, is illustrated with an existing drilled well attached to a wellbore, 209, along which multiple measurements are obtained using techniques known in the art. This wellbore 209, is used to obtain well log data, which may include P-wave velocity, S-wave velocity, Density, among others. Other sensors, not depicted in FIG. 2, may be placed within the survey region to capture seismic data. Seismic data may be used to examine the dependence of amplitude, signal-to-noise, move-out, frequency content, phase, and other seismic attributes, on incidence angles 208, offset measurements 210, azimuth, and other geometric attributes that are important for data processing and imaging of a seismic survey region.

Figure 3:
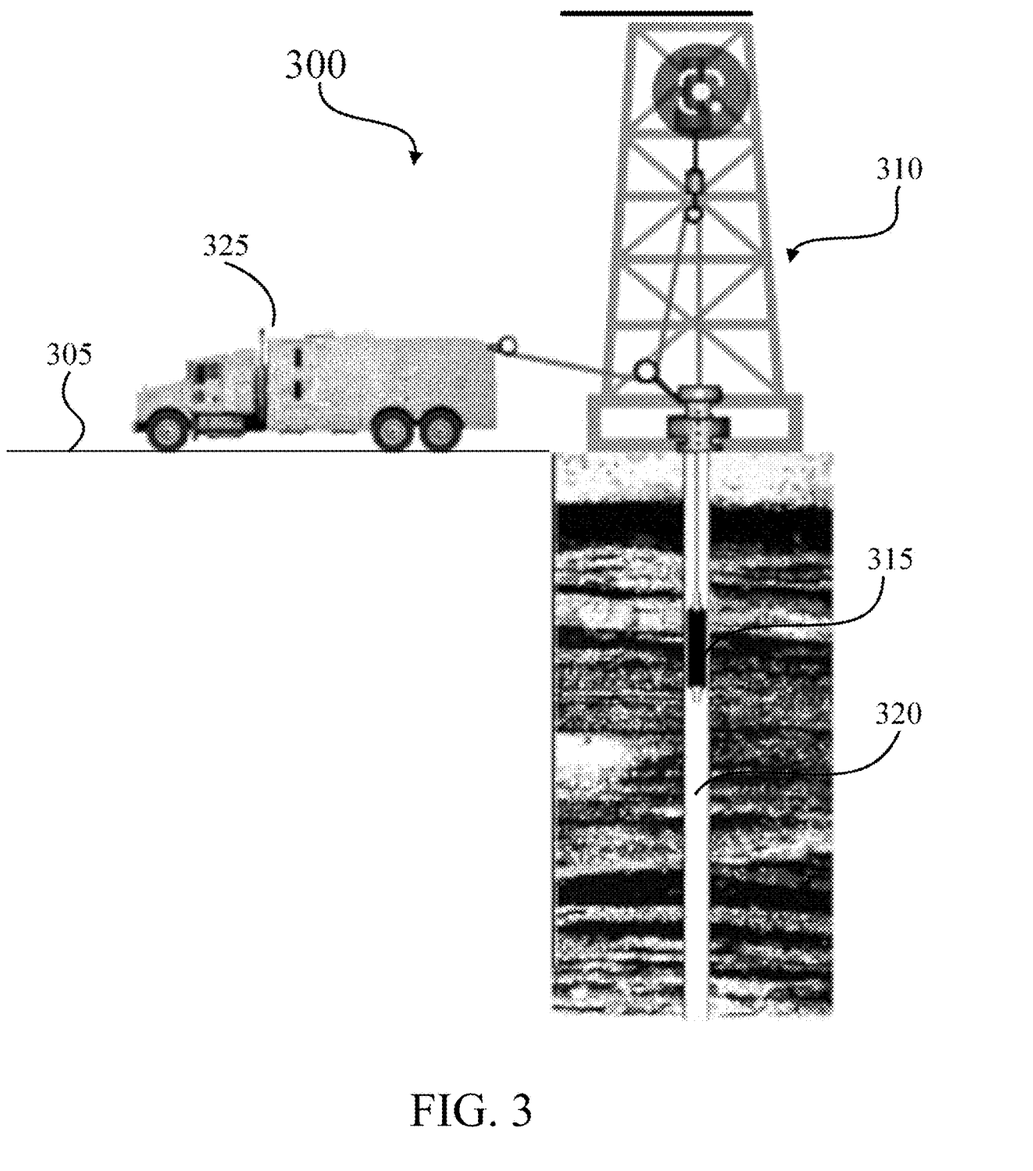
FIG. 3 is a schematic diagram illustrating a cross-sectional view of an environment with a wellbore and a well logging tool including one or more sonic generators and one or more well log data recording sensors according to an embodiment.

FIG. 3 is schematic diagram illustrating a cross-sectional view of a seismic survey region with a wellbore and well logging tool including one or more sonic generator and one or more well log data recording sensors according to an embodiment. A sonic generator is an example of equipment to produce one or more sonic waves (sound waves). A sonic generator may be referred to as a sonic source because the sonic generator produces or generates one or more sonic waves (sound waves) which are also referred to as seismic waves. The one or more well log data recording sensors are examples of one or more seismic data recording sensors (seismic receivers or seismic data recorders) and may be the same seismic data recording sensors as seismic data recording sensors 105. In embodiments of the present invention, oil and/or gas production is discontinued in order to generate seismic waves and record seismic data including reflections of the seismic waves moving through the subsurface of one or more earth formations in the seismic survey region.

FIG. 3 shows an oil drilling system 300 on land 305 including a drilling rig 310. The drilling rig 310 supports the lowering of a well logging tool 315 into a wellbore 320. The well logging tool 315 may include one or more sonic generators (sonic sources) to generate one or more sound waves, which are transmitted into one or more earth formations to generate reflections or reflection waves in the one or more earth formations. Although this example shows one or more earth formations of a land-based survey region, it is understood that this is only an example and that the methods and systems may also be applied to a survey region at the surface or bottom of a body of water such as an ocean. The well logging tool 315 also includes one or more well log data recording sensors. As discussed above, the one or more well log data recording sensors receive and record well log data, which includes reflection data received by the one or more well log data recording sensors in response to the sound waves transmitted into one or more earth formations by the one or more sonic generators. The well log data is an example of seismic data. The well log data may include compression wave velocity or P-wave velocity (Vp), shear wave velocity (Vs), and density, which is an indicator of porosity. This well logging process to record well log data may also be referred to as sonic logging. A vehicle 325 may be coupled to the well logging tool 315 to assist in the lowering and raising of the well logging tool 315 as well as communicating with the well logging tool 315 to obtain well log data. Alternatively, in methods and systems for a survey region at the surface or bottom of a body of water such as an ocean, another device or system may use to assist in the lowering or raising of the well logging tool 315 as well as communicating with the well logging tool 315 to obtain well log data.

Figure 4:
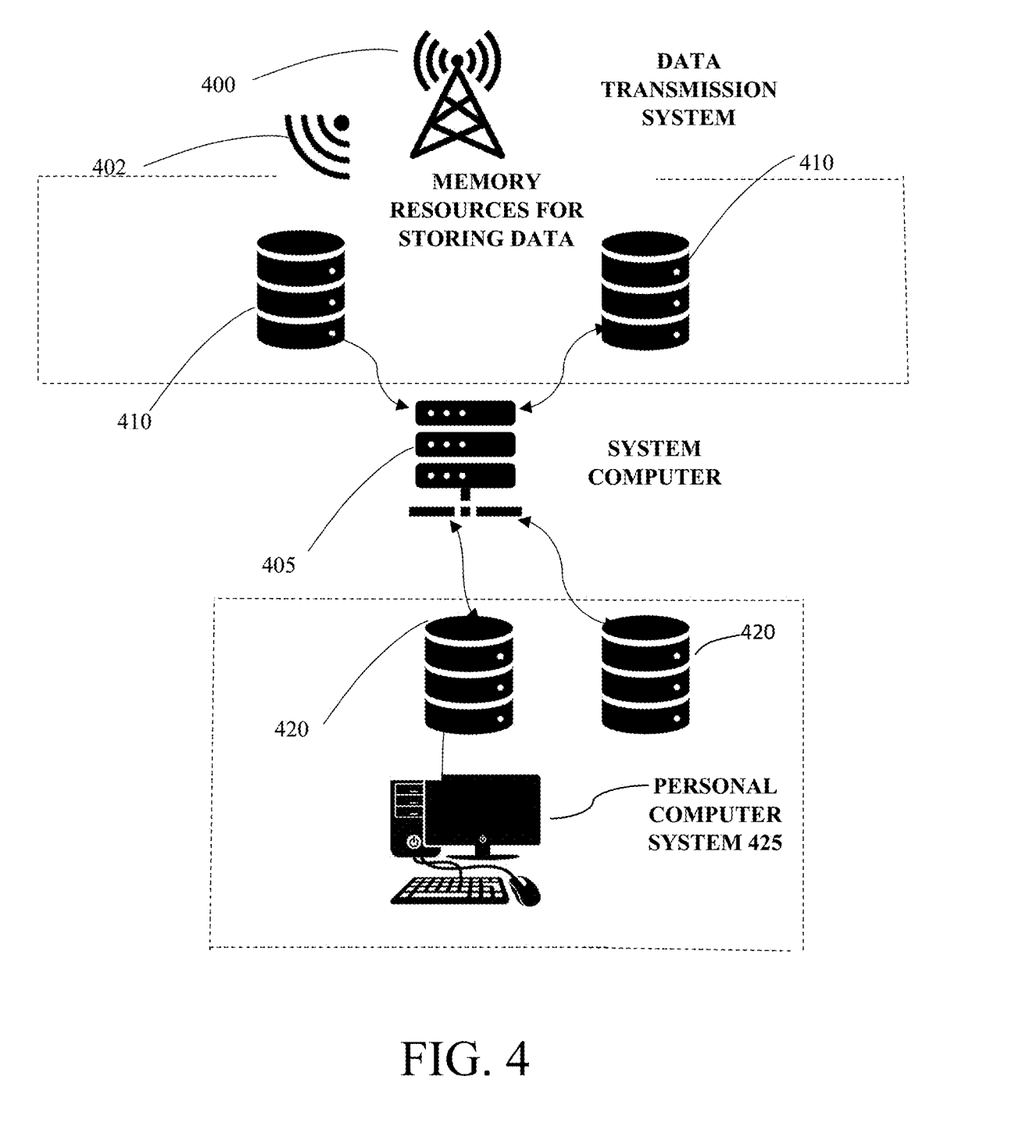
FIG. 4 is a schematic diagram illustrating a high-performance computing system according to an embodiment.

FIG. 4 is a schematic diagram illustrating a high-performance computer system according to an embodiment, which receives (frequently wirelessly) seismic data regarding seismic waves from the seismic data recording sensors 105 in FIGS. 1 and 2 and/or the seismic data recording sensors in FIG. 3, which are also referred to as well log data recording sensors in FIG. 3. The high-performance computer system in FIG. 4 stores the seismic data in at least one memory for later processing and analysis by computer implemented methods and apparatuses of one or more embodiments. The analyzed or processed seismic data may be accessed by a personal computer system. More specifically, FIG. 4 shows a data transmission system 400 for wirelessly transmitting seismic data from seismic data recording sensors to a system computer 405 coupled to one or more storage devices 410 to store the seismic data in databases. The data transmission system may also transmit wirelessly seismic data from seismic data recording sensors 105 directly to one or more storage devices 410 to store the seismic data in databases, which may be accessed by system computer 405. The wireless transmission is denoted by reference numeral 402. The one or more storage devices 410 may also store other computer software instructions or programs to implement apparatuses and methods described in embodiments. The system computer 405 may be coupled (e.g., wirelessly coupled) to one or more output storage devices 420, which may receive the results of computer implemented processes or methods performed by the system computer 405. A personal computer 425 may be coupled (e.g., wirelessly coupled) to one or more output storage devices 420 and/or to the computer system 405 so that a user may utilize a user interface of the personal computer 425 to input information or obtain the results of the computer implemented processor methods performed by the system computer 405. The one or more storage devices 420 may also store other computer software instructions or programs to implement apparatuses and methods described in embodiments.

A user interface of the personal computer 425 may include, for example, one or more of a keyboard, a mouse, a joystick, a button, a switch, an electronic pen or stylus, a gesture recognition sensor (e.g., to recognize gestures of a user including movements of a body part), an input seismic device or voice recognition sensor (e.g., a microphone to receive a voice command), an output seismic device (e.g., a speaker), a track ball, a remote controller, a portable (e.g., a cellular or smart) phone, a tablet PC, a pedal or footswitch, a virtual-reality device, and so on. The user interface may further include a haptic device to provide haptic feedback to a user. The user interface may also include a touchscreen, for example. In addition, a personal computer 425 may be a desktop, a laptop, a tablet, a mobile phone or any other personal computing system.

Processes, functions, methods, and/or computer software instructions or programs in apparatuses and methods described in embodiments herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

The one or more databases may include a collection of data and supporting data structures which may be stored, for example, in the one or more storage devices 410 and 420. For example, the one or more storage devices 410 and 420 may be embodied in one or more non-transitory computer readable storage media, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage devices 410 and 420 are not limited to the above description, and the storage may be realized by other various devices and structures as would be understood by those skilled in the art.

Figure 5:
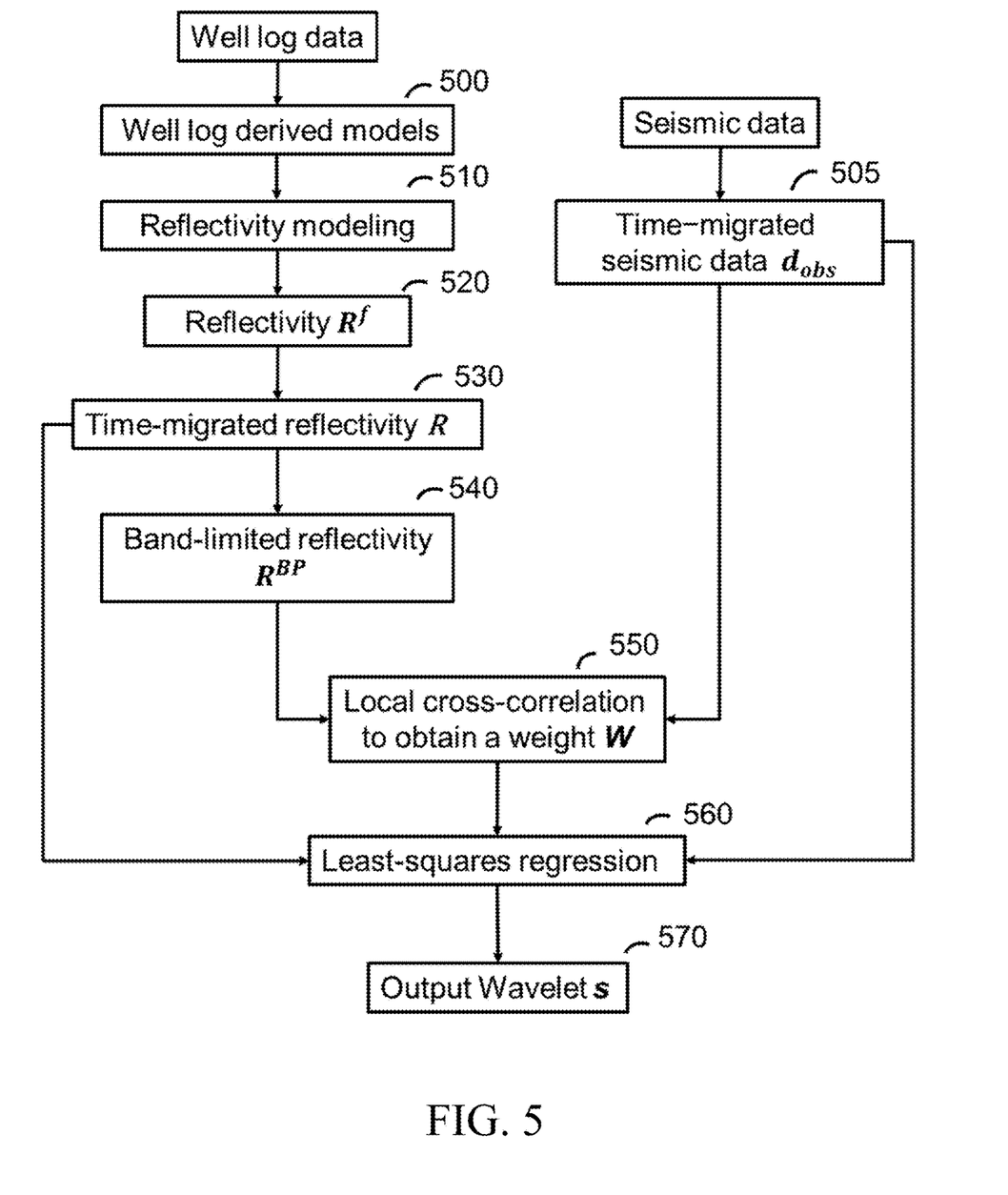
FIG. 5 is a flow diagram illustrating a method for estimating the source wavelet in the current disclosure.

FIG. 5 is a flowchart illustrating a method for estimating the source wavelet according to an embodiment in this disclosure The survey region may be subsurface structures under land or sea.

Referring to the process depicted in FIG. 5, input seismic data from field surveys, $d_{obs}$, i.e., gathers, is stored and/or processed on a computing device in operation 505. Basic data processing including denoising, stacking, and migration may be employed in operation 505. The output is time-migrated observed data—$d_{obs}$. The seismic data recording sensors 105 in FIGS. 1 and 2 and/or the well log data recording sensors of the well logging tool 315 in FIG. 3 may detect the seismic data and transmit the seismic data to the high-performance computing system shown in FIG. 4. As discussed above in FIGS. 1-4, the seismic data detected in the survey region may be stored in one or more memories such as one or more storage devices 410 and one or more output storage devices 420.

Another input data is the well log data recorded by sensors positioned in the wellbore of the survey region by the well logging tool 315. Well log data are processed in operation 500 to generate earth models that represent formation properties, e.g., a P-wave velocity model Vp, a S-wave velocity model $V_s$, or a density model of the formation surrounding the well site. One or more earth models may be used in operation 510 to perform reflectivity modeling. Operation 510 outputs $R^f$, which is a vector composed of the reflection coefficients, which transformed to the time domain in operation 520. $R^f$ is further time-migrated to generate the time-migrated reflectivity vector R in operation 530. Operations 510, 520, and 530 are carried out using the high-performance computer system, such as the one depicted in FIG. 4.

The reflectivity modeling method computes the response of a model in a frequency-wavenumber domain and includes contributions from all the rays within the reflecting zone. It is used for modeling all types of wave propagation and attenuation for a given model with sufficient accuracy and relatively low computational cost. In this embodiment, reflectivity modeling is based on Kennett full wave elastic modeling, aka. Kennett modeling, which is developed by Kennett (Kennett, B. L. N., 1983, Seismic wave propagation in stratified media: Cambridge University Press.). Kennett modeling method is used to generate the synthetic data, which includes primaries, multiples and converted waves, and is accurate for 1D models. Other reflectivity methods, including the one by Müller (Müller, G., 1985, The reflectivity method: a tutorial: J. Geophys., 58, 153-174.) and other variations may also be used.

In operation 540, a band pass filter is convoluted with the reflectivity vector R to produce a band-limited reflectivity $R^{BP}$, the bandwidth of which matches that of the observed data $d_{obs}$. In the time-domain, the band pass filter acts as a zero-phase wavelet so that the band-limited reflectivity $R^{BP}$ is equivalent to synthetic data.

Operation 550 computes a weight matrix, W, using local zero-lag cross-correlations between band-limited reflectivity R and the observed data $d_{obs}$. This operation can be mathematically expressed as in Equation (1):

$$W_i = \sum_{j=-M}^{M} R^{BP}_{i+j} d^{obs}_{i+j}, \qquad (1)$$

in which $W_i$ is the $i^{th}$ diagonal term of the W matrix; M is the half-window length for local cross-correlation; i and j are index values; and $R_{i+j}^{BP}$ is the corresponding band-limited reflection coefficient at the $(i+j)^{th}$ time sample. The value of weight at i time sample is computed by the values of $R^{BP}$ and $d^{obs}$ within the local window of length 2*M+1.

Operation 560 seeks the wavelet s by minimizing the difference between $d_{obs}$ and the synthetic data—$R^{BP}$ in this embodiment. A weighted least-squares optimization is employed to minimize the objective function of the L2 norm of the data residues and then to invert the source wavelet. This operation may be mathematically expressed as in Equation (2):

$$obj = \frac{1}{2}\sum_{i=1}^{i=n} W_i \left(d_i^{obs} - \sum_{j=-L}^{j=L} R_{i-j}s_j\right)^2, \quad (2)$$

in which L is the half length of the source wavelet, R is the time-migrated reflectivity, and s is the source wavelet.

Equation (2) can be solved in Operation 570 to obtain source wavelet s, shown in matrix form in Equation (3):

$$s=(R^T W R)^{-1}(R^T W d_{obs}). \quad (3)$$

Operations 540, 550, 560, and 570 are carried out using the high-performance computer system, such as the one depicted in FIG. 4.

Figure 6:
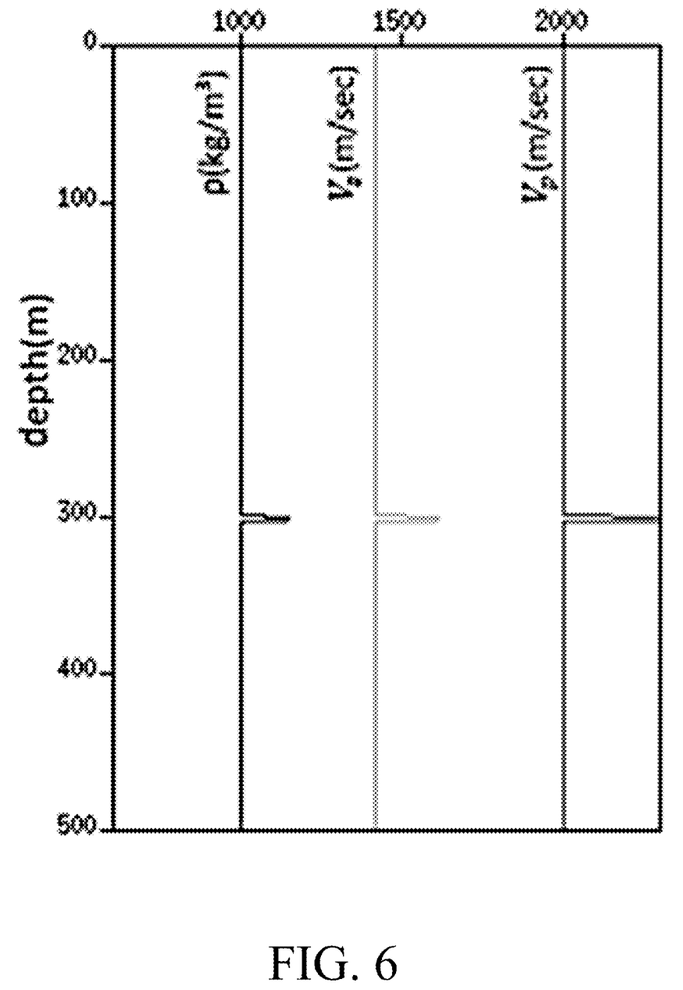
FIG. 6 shows an exemplary synthetic model having one reflector.

FIGS. 6-10C illustrates the results of the process shown in FIG. 5. FIG. 1 shows a synthetic model having one reflector at the depth of 300 m. The P wave velocity Vp is 2000 m/sec, the S wave velocity Vs is 1400 m/sec, and the density ρ is 1000 kg/m3, as shown in FIG. 6.

Figure 7:
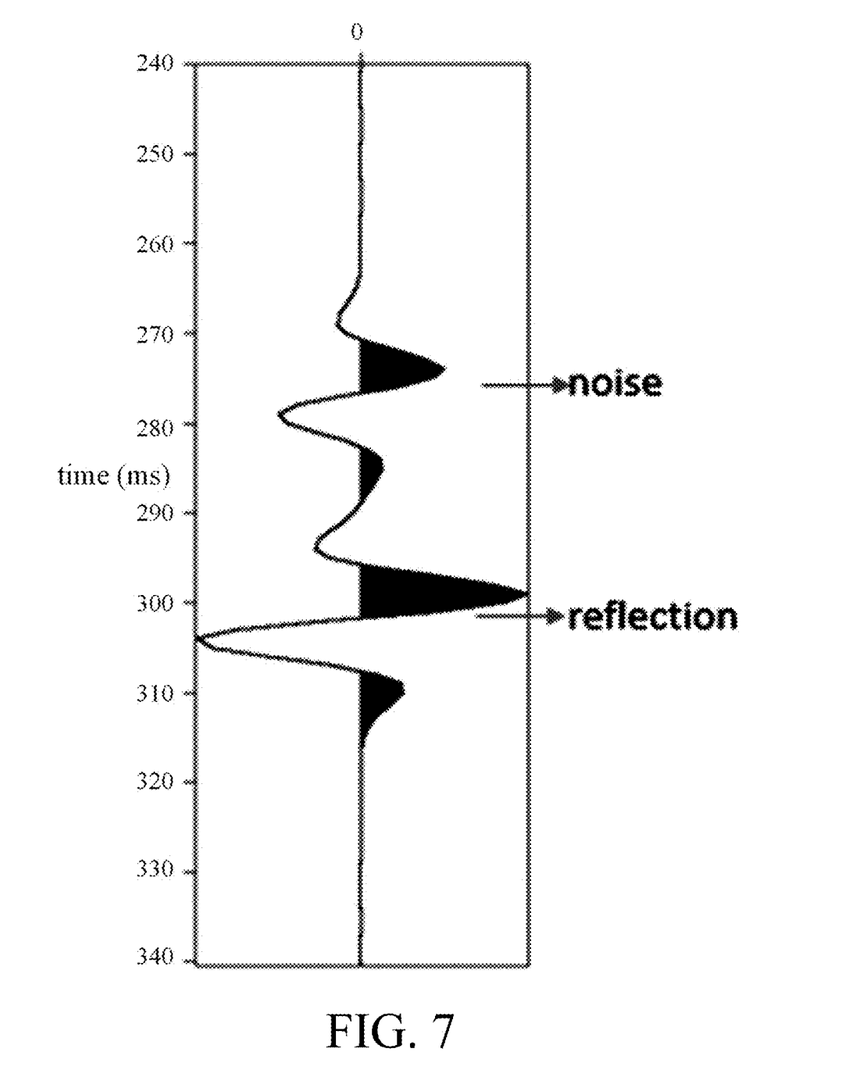
FIG. 7 is the time-migrated observed data using the synthetic model of FIG. 6, showing a strong reflection at about 300 ms as well as noises that are weaker.
Figure 8:
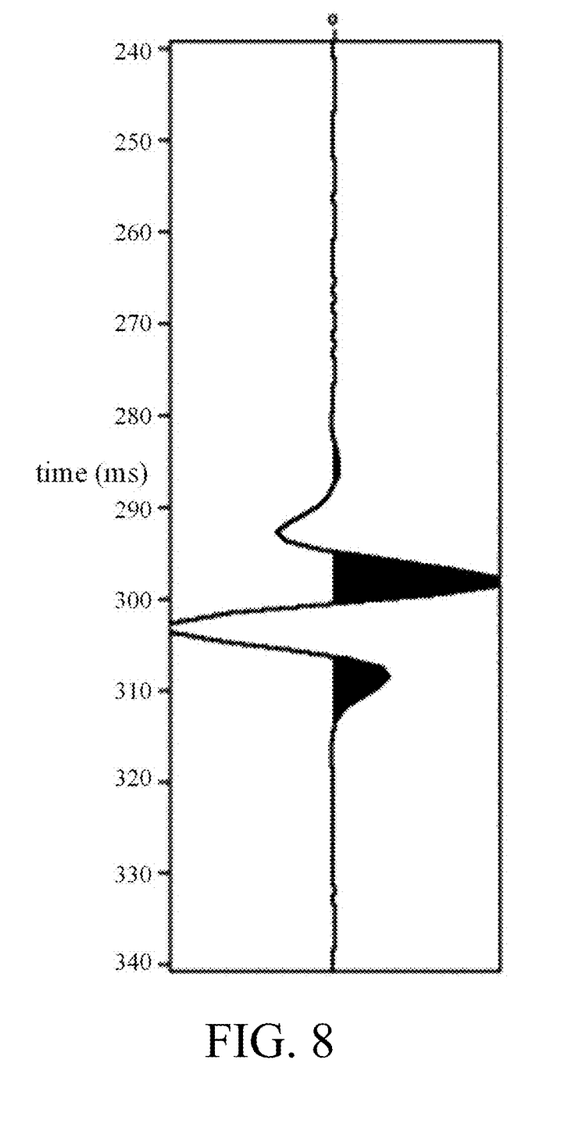
FIG. 8 is the band-limited reflectivity of the model shown in FIG. 6 with the Kennett modeling method.
Figure 9:
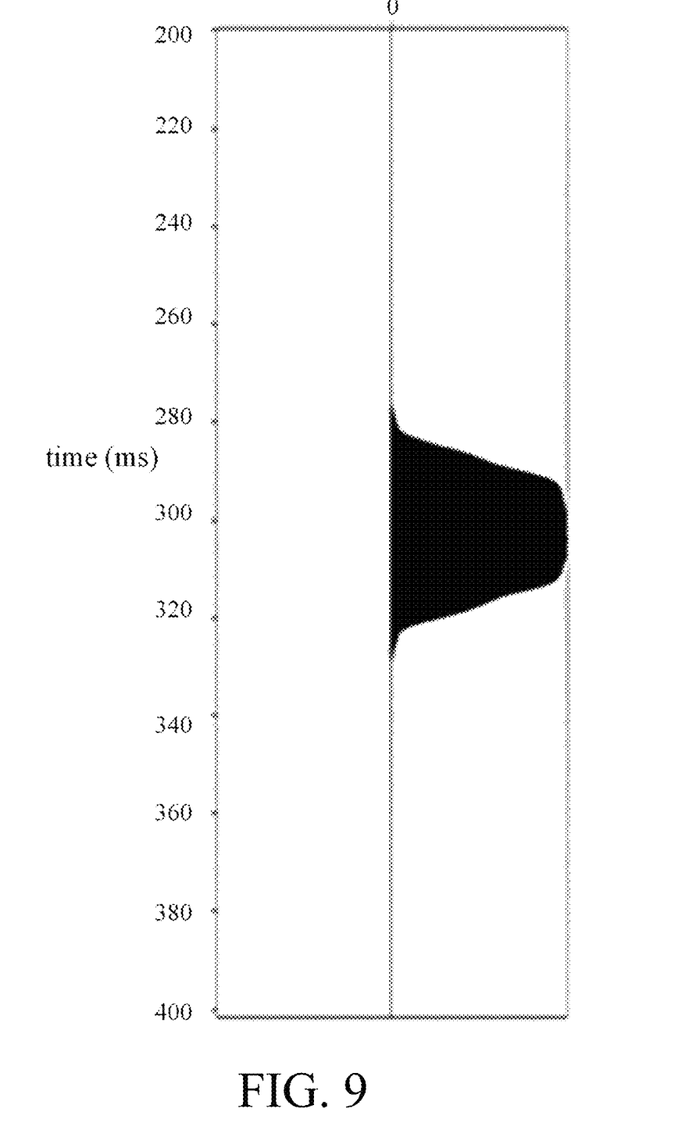
FIG. 9 is the weight used in source estimation and estimated by local cross-correlation between the simulated and the observed data.

FIG. 7 is the time-migrated observed data, corresponding to dobs in Operation 505, which includes one strong reflection which comes from the single reflector at the depth of 300 m and some weaker noise signals. FIG. 8 is the band-limited reflectivity obtained from Kennett modeling and transformed into the time domain, corresponding to $R^{BP}$ in Operation 540. FIG. 9 is the local cross-correlation between the observed data and the bandlimited reflectivity $R^{BP}$ and it's time variant, which corresponds to the wight W used in source estimation according to Equation (3).

Figure 10A:
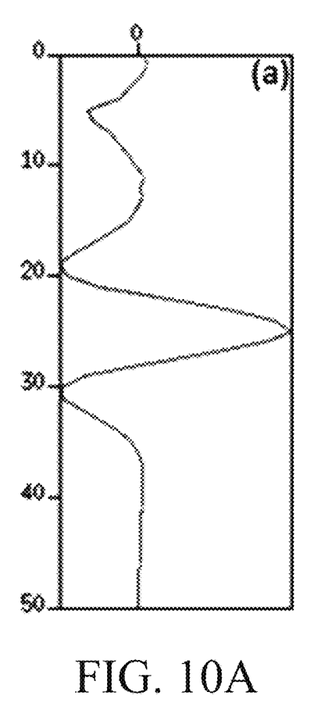
FIG. 10a is the estimated wavelet without using weight in the estimation process.
Figure 10B:
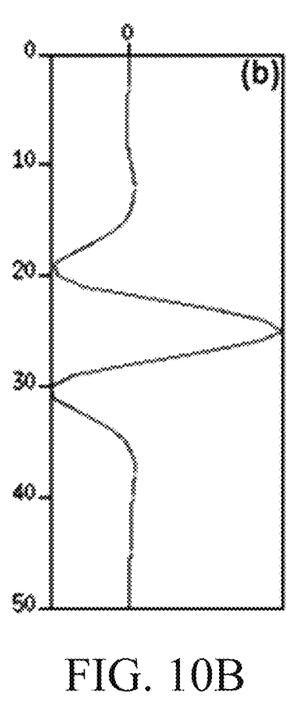
FIG. 10b is the estimated wavelet using weight according to an embodiment in this disclosure.
Figure 10C:
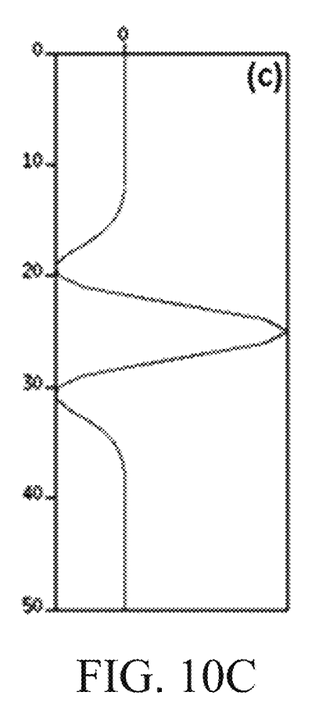
FIG. 10c is the true wavelet.

FIG. 10B shows the estimated wavelet that corresponds to Operation 570, which is the result when the weighted least-squares optimization is employed to minimize the objective function, as shown in Equations (2) and (3). FIG. 10A, on the other hand, shows the estimated wavelet using least-squares optimization without applying the weight. FIG. 10C is true wavelet. As one may readily appreciate, FIG. 10A has a side lobe in the upper portion of the graph while FIG. 10B is much closer to the true wavelet. The comparison demonstrates that, after applying the weight, the estimated source wavelet doesn't have the suspicious side lobe and much more accurate. As such, the cross-correlation between the reflectivity and true reflection in the observed data is much better than that between the reflectivity and the noise. Using the cross-correlation between the synthetic data and the observed data as the weight greatly enhances the impact of the signal and minimizes the effect of the noise.

Although the embodiments may employ a FWI algorithm with a full waveform (difference) misfit function and/or untilize elastic wave equations for seismic propagation. It would be apparent to a person having ordinary skills in the art that it can also be alternatively applied to acoustic wave equations and pseudo-acoustic wave equations, in both isotropic and anisotropic media, without departing from the true scope of the invention, as defined in the claims set forth below.

We claim:

1. A method for estimating source wavelet for seismic survey, comprising:
   (a) positioning seismic data recording sensors a plurality of locations in the survey region and positioning a well logging tool comprising a sonic generator and one or more well log recording sensors in a well bore in the survey region;
   (b) emitting at points of incidence in the survey region to generate seismic waves, which travel through subsurface earth formations;
   (c) observing the seismic waves and recording seismic data based on the seismic waves using the seismic data recording sensors;
   (d) conducting well logging operation using the well logging tool and recording well log data using the one or more well log recording sensors;
   (e) transmitting the seismic data from the seismic data recording sensors and the well log data from the one or more well log recording sensors to a computer system including one or more memories and storing the seismic data and the well log data in the one or more memories;
   (f) performing, by the computer system, time migration to the seismic data to obtain observed data;
   (g) processing, by the computer system, the well log data to obtain one or more earth models that represent one or more formation properties;
   (h) performing, by the computer system, reflectivity modeling and time migration to obtain a reflectivity;
   (i) convoluting, by the computer system, a band pass filter with the reflectivity to produce a band-limited reflectivity;
   (j) cross-correlating, by the computer system, the band-limited reflectivity with the observed data to obtain a weight; and
   (k) performing, by the computer system, inversion to obtain a source wavelet based on the weight, the reflectivity, and the observed data, and least-squares regression to minimize a difference between the observed data and the band-limited reflectivity.

2. The method of claim 1, wherein the reflectivity modeling is based on Kennett modeling.

3. The method of claim 2, wherein the one or more earth models is selected from a P-wave velocity model, a S-wave velocity model, and a density model of the formation.

4. The method of claim 1, wherein step k is expressed as $$s=(R^T W R)^{-1}(R^T W d_{obs}),$$

wherein s represents the source wavelet, R represents the time-migrated reflectivity, W represents the weight, and $d_{obs}$ represents the observed data.

5. The method of claim 1, wherein step j is expressed as $$W_i = \sum_{j=-M}^{M} R_{i+j}^{BP} d_{i+j}^{obs},$$

wherein $W_i$ is the $i^{th}$ diagonal term of a matrix of the weight, M is a half-window length for local cross-correlation; i and j are index values; and $R_{i+j}^{BP}$ is the corresponding band-limited reflection coefficient at the $(i+j)^{th}$ time sample.

6. The method of claim 5, further comprising computing a value of weight at i time sample using values of $R^{BP}$ and $d^{obs}$ within the local window of length 2*M+1.

7. A system for estimating a source wavelet of a survey region, the system comprising:
- a plurality of seismic data recording sensors positioned in the survey region at different locations;
- a well logging tool having a sonic generator, and seismic data recording sensors positioned in a well bore in the survey region;
- a blasting device positioned at each point of incidence in the survey region to generate seismic waves, which travel through subsurface earth formations; and
- wherein the seismic data recording sensors and the well logging tool transmit well log data to a computer system including one or more memories and at least one processor, the one or memories store the seismic data, well log data, and instructions, and the one or more processors execute the instructions stored in the one or more memories to implement:
- processing the well log data to build one or more earth models, to perform reflectivity modeling to obtain a reflectivity, and to apply a band-pass filter to the reflectivity to generate a band-limited reflectivity;
- cross-correlating the band-limited reflectivity and seismic data to obtain a weight;
- obtaining a source wavelet based on the reflectivity, the weight, and the seismic data by inversion; and
- minimizing a difference between the observed data and the band-limited reflectivity by least-squares regression.

* * * * *